Figure 4:
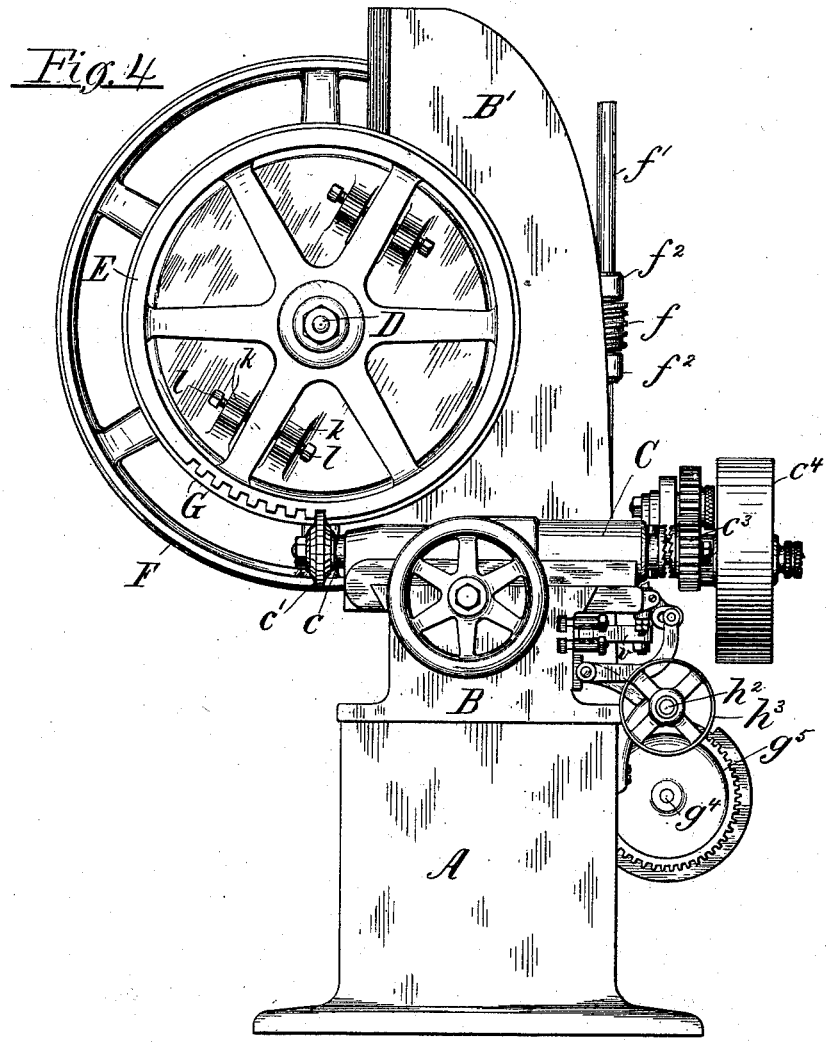

(No Model.)  4 Sheets—Sheet 1.
E. H. PARKS.
GEAR CUTTING MACHINE.
No. 505,606.  Patented Sept. 26, 1893.
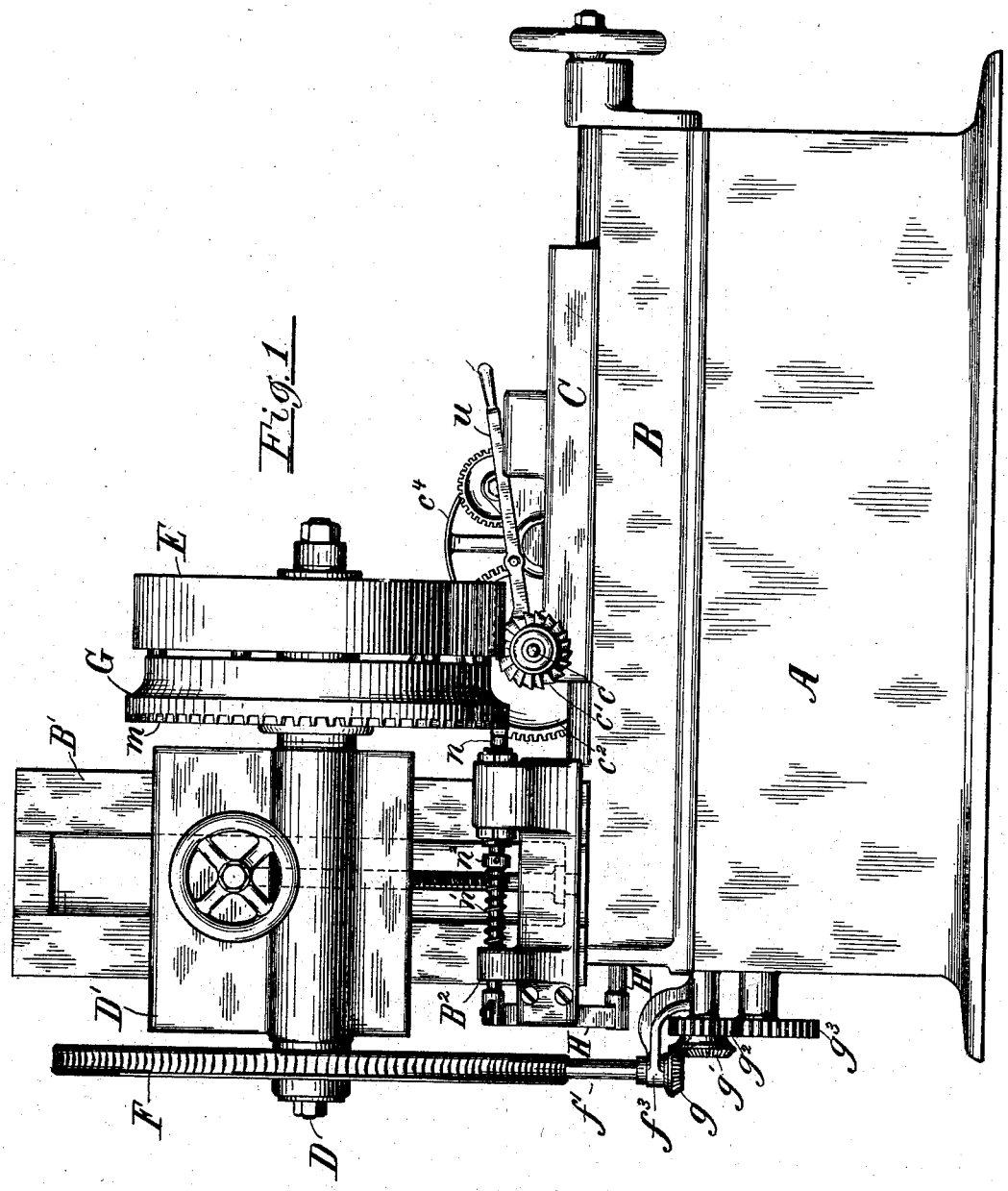
Witnesses:
W. H. Thurston
S. J. Murphy
Inventor:
Edward H. Parks

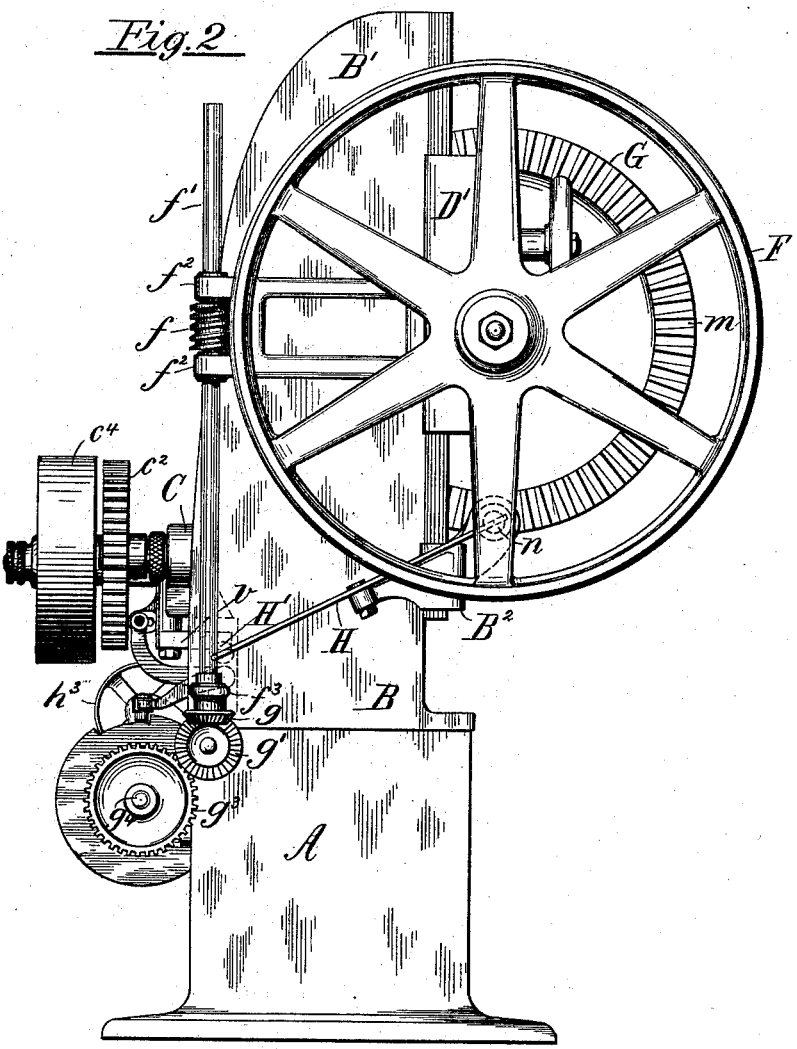

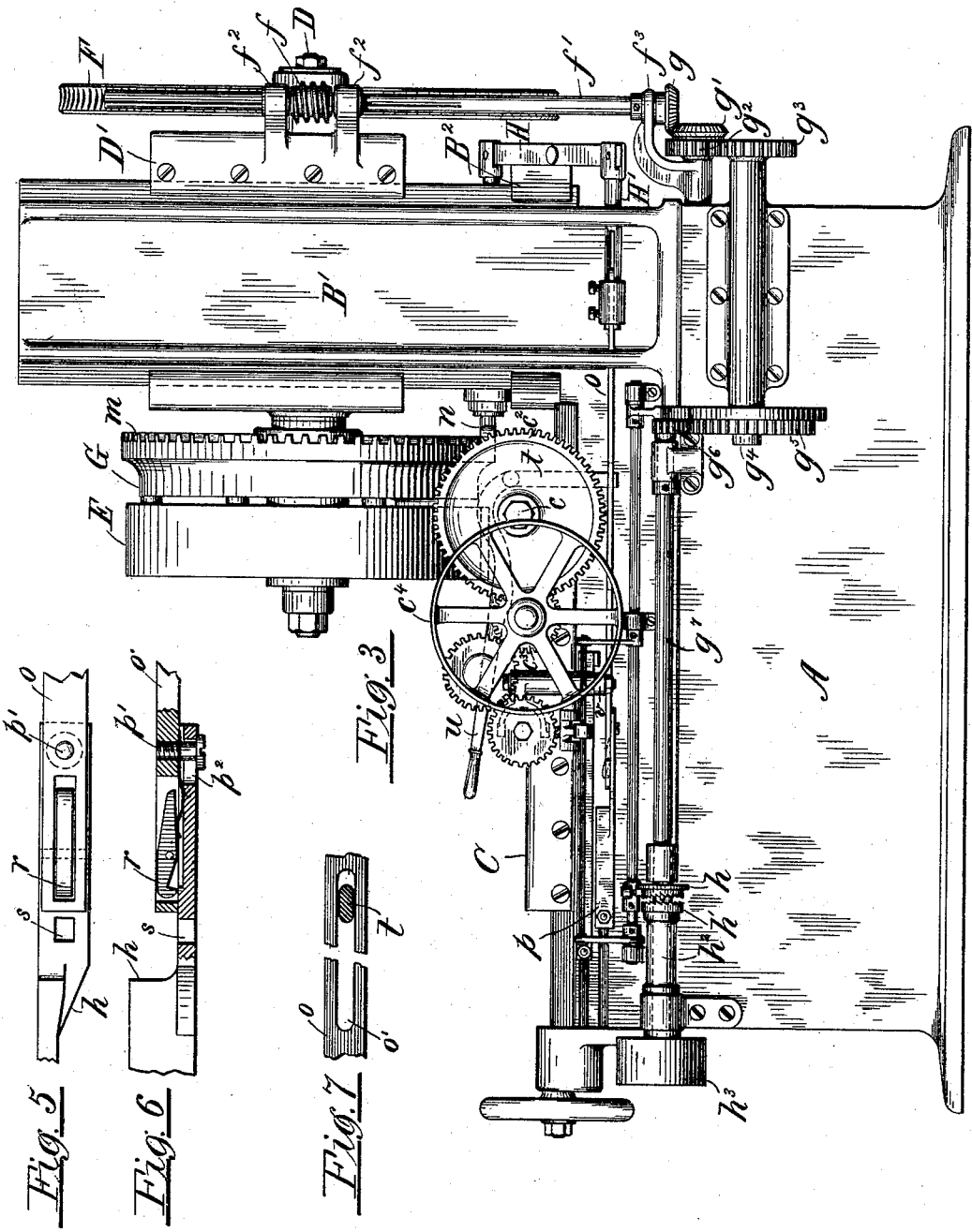

(No Model.)  4 Sheets—Sheet 4.

E. H. PARKS.
GEAR CUTTING MACHINE.

No. 505,606. Patented Sept. 26, 1893.

Witnesses:
W. H. Thurston
S. J. Murphy

Inventor:
Edward H. Parks

UNITED STATES PATENT OFFICE.

EDWARD H. PARKS, OF PROVIDENCE, RHODE ISLAND, ASSIGNOR TO THE BROWN & SHARPE MANUFACTURING COMPANY, OF SAME PLACE.

GEAR-CUTTING MACHINE.

SPECIFICATION forming part of Letters Patent No. 505,606, dated September 26, 1893.

Application filed June 6, 1892. Serial No. 435,597. (No model.)

*To all whom it may concern:*

Be it known that I, EDWARD H. PARKS, of the city and county of Providence, in the State of Rhode Island, have invented certain new and useful Improvements in Gear-Cutting Machines; and I do hereby declare the following specification, taken in connection with the accompanying drawings, forming a part of the same, to be a full, clear, and exact description thereof.

The invention relates to machines for cutting teeth on gear wheels, and the object of the invention is to secure the more accurate and uniform formation of the teeth to be cut.

To that end the first feature of invention consists in providing means for accurately indexing and securely holding and supporting the gear to be cut, and in order to render the same applicable to an automatic gear cutting machine a further feature of invention consists in providing means for automatically locking said gear in position and automatically unlocking the gear when it is to be turned for the cutting of the next tooth.

Referring to the drawings, Figure 1 is a front elevation of an automatic gear cutting machine embodying my invention. Fig. 2 is an end elevation of the same. Fig. 3 is a rear elevation of the same. Fig. 4 is an end elevation of the same at the opposite end of the machine from Fig. 2; and Figs. 5, 6, 7 and 8 are detail views upon an enlarged scale of certain of the parts.

The machine shown in the drawings, apart from the features of invention to be hereinafter described, is a well known form of automatic gear cutting machine which it will not be necessary in this connection to describe in all its details, but only so far as will be sufficient for an understanding of the present invention.

In the accompanying drawings A represents the base of the machine, to which is firmly secured the bed B having the upright B' formed integral therewith.

C is the cutter slide arranged to slide in ways on the bed B and carrying the cutter arbor $c$. To one end of the cutter arbor $c$ the cutter $c'$ is secured, and the opposite end of the cutter arbor is provided with a spur gear $c^2$ as shown in Fig. 3. The gear $c^2$ meshes with another spur gear $c^3$ loosely mounted upon a stud fixed to the slide C. Connected to the gear $c^3$ is a pulley $c^4$ to be revolved by a belt from a suitable source of power, and by means of which pulley and the gearings $c^2$, $c^3$, the cutter arbor will be revolved.

D is an arbor journaled in a slide D' arranged to slide upon the upright B'. To one end of this arbor D the gear E to be cut is secured, while to the opposite end is secured a worm wheel F which is engaged and operated by a worm $f$ connected to the worm shaft $f'$ by a groove and spline connection, the worm $f$ being held in vertical position upon the shaft by the bearings $f^2$ in a bracket extending from the slide D'. The lower end of the shaft $f'$ is journaled in a bracket $f^3$ secured to the base of the machine, and is provided with a bevel gear $g$ which meshes with a fellow bevel gear $g'$ likewise journaled in said bracket. Attached to the bevel gear $g'$ is a spur gear $g^2$ which meshes with a fellow gear $g^3$ mounted upon a short shaft $g^4$ supported in a bearing upon the base of the machine, as shown in Fig. 3. The shaft $g^4$ carries at its opposite end a spur gear $g^5$ which in turn meshes with a pinion $g^6$ upon the end of another shaft $g^7$ journaled upon the bed of the machine. This shaft $g^7$ is provided with a sliding clutch member $h$ arranged to be engaged with a fellow clutch member $h'$ upon the end of a short shaft $h^2$, to the outer end of which is secured a pulley $h^3$ to be driven from a suitable source of power. By the train of gearing above described, when the clutch member $h$ is engaged with the clutch member $h'$, the worm shaft $f'$ and worm $f$ will be revolved and thus turn the worm wheel F, and through the arbor D move the gear E in a direction to bring it into proper position for the cutting of the next tooth thereon.

The mechanism for feeding the tool slide C is not fully shown in the drawings, as it forms no part of the present invention, but the same is well known and need not be here described.

Heretofore the gear to be cut was secured to the end of the arbor D and was supported solely by said arbor. Furthermore, the gear was moved from one tooth to the next entirely by the worm $f$ and worm wheel F, and was held in the required position for the cutting of a tooth thereon solely by the engagement of said worm and worm wheel. With this arrangement there was liability to variation by reason of the tendency of the arbor D to spring under the action of the cutter upon the gear, which would be supplemented by a like tendency to spring of the arms or rim of the gear itself as well as of the other parts of the machine, and, furthermore, as the parts became worn there would be a liability to variation in the location and formation of the teeth due to play or lost motion between the worm $f$ and its worm wheel F. The object of the present invention is to obviate these liabilities to variation, and to positively and accurately index the gear and firmly hold and support it in the required position for the cutting of each tooth. For that purpose there is secured to the arbor D a face plate G provided with lugs $k$ carrying clamp screws $l$ for clamping one or more of the arms of the gear, as shown in Fig. 4. The face plate G is provided upon its opposite side and around its rim with a series of notches $m$, as shown in Figs. 1 and 2. Arranged to engage with the notches $m$ of the face plate G is a spring bolt $n$ arranged to slide in bearings in a bracket $B^2$ secured to the upright $B'$, as shown in Fig. 1. A spiral spring $n'$ surrounds the bolt $n$, bearing at one end against one of the arms of its supporting bracket, and at the other against a collar $n^2$ secured to the bolt $n$, said spring acting to force the bolt $n$ in a direction to engage with one of the notches $m$ in the face plate. The end of the bolt $n$ is provided with a double bevel, as shown in Fig. 8.

In order to permit of the vertical adjustment of the arbor D and the gear E and face plate G secured thereto, for the purpose of regulating the depth of cut to be made in forming teeth upon the gear, the notches $m$ are formed with parallel sides, as shown in Fig. 2, whereby the beveled end of the spring bolt $n$ may always enter said notches to the same extent, and snugly engage the walls of each notch in any adjusted position of the face plate.

By the arrangement and combination of parts above described the gear to be cut will be firmly held and supported by the face plate G, and all liability to variations due to the springing of the parts will be thereby avoided. Furthermore, the bolt $n$, in connection with the notches $m$ on the face plate G, which said notches correspond in number with the number of teeth to be cut upon the gear, serves as an index to positively and definitely locate the position of the gear E for the cutting of a tooth thereon, and by means of the engagement of said bolt $n$ with one of the notches $m$, the gear will be firmly and securely held in the proper position for the cutting of the tooth. By this arrangement, as will be seen, the worm $f$ and worm wheel F are relieved from the duty of holding the gear in position for the cutting of a tooth thereon, and with the result that any play or lost motion between said worm and worm wheel resulting from wear or otherwise will be entirely immaterial and will in no way affect the accurate formation of the teeth.

In order to enable the improvement above described to be employed in connection with a gear cutting machine which is automatic in its operations, it is desirable to provide means for automatically operating the bolt $n$ to engage and disengage the notches $m$ upon the face plate G. For this purpose the outer end of the bolt $n$ is connected to one end of a lever H pivoted to an arm of the bracket $B^2$, as shown in Figs. 2 and 3. To the opposite end of the lever H is pivoted one end of a connecting rod $H'$, to the other end of which is adjustably connected a sliding bar $o$. The other end of the slide bar $o$ rests upon an arm of the bracket $p$. A guide screw $p'$ projecting from the slide bar $o$ enters a slot $p^2$ in the end of said bracket $p$, as shown on an enlarged scale in Fig. 6. Pivoted in a recess at the end of the slide bar $o$ is a hook or latch $r$, the hook or nose of which is adapted to engage a recess $s$ in the bracket $p$. The bar $o$ is provided with a central longitudinal slot $o'$ extending a considerable portion of the length of said bar, into which slot the end of a depending bolt $t$ extends, all as shown in Fig. 7. The bolt $t$ is arranged to slide vertically in a recess formed in the tool slide C, and at its upper end is pivoted to the end of the lever $u$, as shown in dotted lines in Fig. 3.

The operation of the parts above described is as follows: Assuming the bolt $n$ to be in engagement with one of the notches $m$ on the face plate G, and the cutter to be completing the cut of a tooth in the gear E, as shown in the drawings, the parts will be in the position shown in Fig. 3. When now the cutting of the tooth has been completed, the cutter slide C will be automatically moved back by feed mechanism of a well known construction not fully shown in the drawings. As the slide C is moved backward, the bolt $t$ will at the proper time reach the end of the slot $o'$ in the slide bar $o$, and the continued movement of the slide C will, through the action of said bolt, cause said slide bar to be moved in a direction to withdraw the spring bolt $n$ from engagement with its notch in the face plate G. When the bolt $n$ has been thus disengaged the clutch $h$ is, by means of well known mechanism, automatically engaged with the clutch $h'$, thereby causing, through the connecting mechanism, the worm $f$ and the worm wheel F to be rotated so as to turn the arbor D and gear E in a direction to bring said gear E into position for the cutting of the next tooth.

Ordinarily in machines of this character the slide C begins its forward movement before the movement of the gear E under the action of the worm wheel F has been completed. If no means were provided to prevent it, as soon as the cutter slide C began to move forward the bolt $n$ would be free to move under the action of its spring $n'$ in a direction to engage one of the notches $m$. As the face plate G is at this time in motion, it is desirable that the bolt $n$ should be kept from moving until after the movement of the gear E and face plate G has ceased, or at least until the face plate G has moved far enough so that the bolt $n$ when released will engage the next succeeding notch. In order to thus hold the bolt $n$ out of engagement until the proper time, and to prevent its moving under the action of its spring immediately upon the commencement of the forward movement of the tool slide C, the spring latch $r$ is provided, the operation of which is, that when the slide bar $o$ has been moved far enough the hook of the latch $r$ will, under the action of its spring, engage the recess $s$ in the bracket $p$, and thus hold the bolt $n$ out of engagement until in the forward movement of the slide C a bar $v$ connected to said slide engages the tail of the latch $r$, and depressing it, releases the hook from the recess $s$ and permits the bolt $n$ to be moved under the action of its spring to engage one of the notches $m$.

When it is desired to run the slide C back sufficiently far to permit of the removal of the gear after its teeth have been cut, the bolt $t$ is withdrawn from the slot of the slide bar $o$ by means of the lever $u$, the bolt being returned to its normal position when the cutting of the next gear is resumed.

With the arrangement above described it is not necessary that the gear and its face plate shall be turned to exactly the right position by means of the worm and worm wheel, and for the reason that the position of the gear may be accurately determined by the bolt $n$. Consequently any play or lost motion in the worm or worm wheel is in no way detrimental, and in fact it is found preferable in practice to purposely provide such lost motion, as for instance by giving a certain amount of end play to the worm $f$ upon its shaft, as shown in the drawings, so that the gear and its face plate will not be moved by said worm and worm wheel to exactly the right position, but only approximately so, the engagement of the bolt $n$ with one of the notches $m$ being relied upon to complete the movement of the gear and face plate and to accurately locate the gear and hold it in the required position. Thus the gear will always be positively located in exactly the right position for the formation of the next tooth in series and firmly held in such position, with the result that the successive teeth will be formed with much greater accuracy and uniformity than has been heretofore possible.

I am aware that it is not new to make use of an index plate in combination with a spring-bolt co-operating therewith, and such combination I do not claim.

What I claim as my invention, and desire to secure by Letters Patent, is—

1. In a gear-cutting machine the combination, with the gear-supporting arbor, of a face-plate for holding and supporting the gear to be cut, said face-plate being provided with a series of notches, mechanism for turning said face-plate and the gear secured thereto, said mechanism having a certain amount of lost motion, and a spring-pressed bolt for engaging in turn each of the notches in said face-plate, whereby said face-plate and gear will be moved only approximately to the right position by said turning mechanism, and whereby said gear will be accurately and positively located by means of the engagement of said spring bolt with one of said notches, substantially as described.

2. In a gear-cutting machine the combination, with the gear-supporting arbor, of a face-plate for holding and supporting the gear to be cut, said face-plate being provided with a series of notches having parallel sides, and a spring-pressed bolt for engaging each of said notches in turn, said spring bolt being provided at its end with a double bevel, whereby said face-plate and the gear to be cut may be adjusted vertically to regulate the depth of cut to be made in forming teeth upon the gear, and be accurately and securely held in any adjusted position, substantially as described.

3. In a gear-cutting machine the combination, with the gear-supporting arbor, of a face-plate for holding and supporting the gear to be cut, said face-plate being provided with a series of notches, a spring-pressed bolt for engaging each of said notches in turn, and means, substantially as described, for automatically operating said spring bolt, whereby it will be allowed to engage one of the notches in said face-plate and accurately and securely hold said face-plate and the gear to be cut during the formation of a tooth, and be automatically disengaged when the cutting of each tooth is completed to permit the turning of the face-plate and its attached gear for the cutting of the next tooth thereon, substantially as described.

4. In a gear-cutting machine the combination, with the gear-supporting arbor and the cutter slide, of a face-plate for holding and supporting the gear to be cut, said face-plate being provided with a series of notches, a spring-pressed bolt for engaging each of said notches in turn, a slide-bar operated by the cutter slide to withdraw said spring-pressed bolt, said slide-bar being provided with a spring latch to hold said spring-pressed bolt in its disengaged position, and means actuated by said cutter slide for unlatching said slide-bar to permit the engagement of said spring-pressed bolt under the action of its spring with the next succeeding notch of said face-plate, substantially as described.

EDWARD H. PARKS.

Witnesses:
W. H. THURSTON,
S. J. MURPHY.